(12) United States Patent
Garen et al.

(10) Patent No.: US 10,703,454 B2
(45) Date of Patent: Jul. 7, 2020

(54) MODULAR PROPULSION UNIT NOZZLE

(71) Applicant: Kongsberg Maritime CM AS, Ålesund (NO)

(72) Inventors: Rune Garen, Eiksund (NO); Steinar Aasebø, Gurskøy (NO)

(73) Assignee: Kongsberg Maritime CM AS, Ålesund (NO)

( * ) Notice: Subject to any disclaimer, the term of this patent is extended or adjusted under 35 U.S.C. 154(b) by 93 days.

(21) Appl. No.: 15/569,521

(22) PCT Filed: Apr. 26, 2016

(86) PCT No.: PCT/EP2016/059214
§ 371 (c)(1),
(2) Date: Oct. 26, 2017

(87) PCT Pub. No.: WO2016/173997
PCT Pub. Date: Nov. 3, 2016

(65) Prior Publication Data
US 2018/0222561 A1 Aug. 9, 2018

(30) Foreign Application Priority Data
Apr. 28, 2015 (EP) .................................. 15165355

(51) Int. Cl.
*B63H 5/15* (2006.01)
*B63B 1/34* (2006.01)

(52) U.S. Cl.
CPC ............. *B63H 5/15* (2013.01); *B63B 1/34* (2013.01); *Y02T 70/121* (2013.01)

(58) Field of Classification Search
CPC .......................... B63H 5/15; B63H 2005/1254
See application file for complete search history.

(56) References Cited

U.S. PATENT DOCUMENTS 4,140,433 A * 2/1979 Eckel ........................ F03D 1/04
415/209.1
4,509,925 A * 4/1985 Wuhrer ..................... B63H 5/14
415/221

(Continued)

FOREIGN PATENT DOCUMENTS

CN 201049731 Y 4/2008
CN 101434292 A 5/2009
(Continued)

OTHER PUBLICATIONS

Chinese search report and English translation issued by Chinese Patent Office dated Nov. 2, 2018.
(Continued)

*Primary Examiner* — Igor Kershteyn
*Assistant Examiner* — Jason G Davis
(74) *Attorney, Agent, or Firm* — Woodard, Emhardt, Henry, Reeves & Wagner, LLP

(57) ABSTRACT

The present invention relates to a propulsion unit nozzle for being arranged around a propeller in a propulsion unit, comprising: a load bearing core structure extending in a circumference of the propulsion unit nozzle; and a plurality of hydrodynamic elements mounted on and enclosing the core structure thereby defining the outer and the inner surfaces of the propulsion unit nozzle. The invention further relates to a propulsion unit for a vessel comprising a propulsion unit nozzle and to a method for the manufacture of a propulsion unit nozzle.

19 Claims, 3 Drawing Sheets

(56) References Cited

U.S. PATENT DOCUMENTS

| | | | |
|---|---|---|---|
| 4,789,302 A | 12/1988 | Gruzling | |
| 5,799,394 A | 9/1998 | Rice | |
| 8,246,401 B2 | 8/2012 | Kluge | |
| 2011/0243736 A1* | 10/2011 | Bell | F03D 1/0675 |
| | | | 416/132 R |

FOREIGN PATENT DOCUMENTS

| | | | | |
|---|---|---|---|---|
| GB | 1070743 | | 6/1967 | |
| GB | 1472544 A | * | 5/1977 | B63H 5/14 |
| JP | 56142789 | | 11/1981 | |
| RU | 1104055 | | 7/1984 | |
| WO | WO-2013169116 A1 | * | 11/2013 | B63H 5/125 |

OTHER PUBLICATIONS

Machine translation of CN201049731Y by Total Patent Lexis Nexis on Dec. 19, 2018 (pp. 11).

International Search Report and Written Opinion issued in related PCT/EP2016/059214 dated May 27, 2016.

European Search Report received in related EP19179394.2 dated Nov. 4, 2019 (pp. 8).

Machine translation of JP56142789 by Pat Base on Nov. 5, 2019 (pp. 7).

Machine translation of RU1104055 by Pat Base on Nov. 5, 2019.

\* cited by examiner

MODULAR PROPULSION UNIT NOZZLE

FIELD OF THE INVENTION

The present invention relates to a propulsion unit nozzle for being arranged around a propeller in a propulsion unit, comprising: a load bearing core structure extending in a circumference of the propulsion unit nozzle; and a plurality of hydrodynamic elements mounted on and enclosing the core structure thereby defining the outer and the inner surfaces of the propulsion unit nozzle. The invention further relates to a propulsion unit for a vessel comprising a propulsion unit nozzle and to a method for the manufacture of a propulsion unit nozzle.

BACKGROUND OF THE INVENTION

Propulsion units, such as azimuth thrusters, are widely used in the maritime industry as primary or secondary means of propulsion for a broad range of vessel types.

Propulsion units are often provided with a propulsion unit nozzle arranged around the propeller and designed to increase the efficiency of the propulsion unit. The propulsion unit nozzle or propulsion unit nozzle affects the flow of water past the propeller and transfers hydrodynamic forces to the vessel. Propeller nozzles are used in connection with both pushing and pulling propulsion system.

Traditionally, propeller nozzles have been of a simple standardised design suitable for manufacturing as welted construction. However, with increased focus on efficiency and reduced emission, a need for propeller nozzles with improved hydrodynamic characteristics has arisen. Improved hydrodynamic characteristics may for example be achieved by designing propeller nozzles according to vessel and propulsion system characteristics and use. To be able to achieve such desirable hydrodynamic characteristics it is often necessary to design propeller nozzles with more complex surface geometries, such as surfaces of double and triple curvatures.

As traditional welding based manufacturing processes are not suitable for producing such surfaces of double and triple curvature, it would be advantageous with constructions that are easier and more effective in terms of design and manufacturing. Additionally, it would be advantageous to achieved improved manufacturing processes.

OBJECT OF THE INVENTION

An object of the present invention is to provide an alternative to the prior art.

In particular, it may be seen as a further object of the present invention to provide a propulsion unit nozzle, more specifically a propeller nozzle that solves the above-mentioned problems of the prior art with regard to design and manufacturing.

SUMMARY OF THE INVENTION

Thus, the above described object and several other objects are intended to be obtained in a first aspect of the invention by providing a propulsion unit nozzle for being arranged around a propeller in a propulsion unit, the propulsion unit nozzle being defined by an outer surface and an inner surface, wherein the propulsion unit nozzle comprises: a load bearing core structure extending in a circumference of the propulsion unit nozzle between the outer surface and the inner surface; and a plurality of hydrodynamic elements mounted on and enclosing the core structure thereby providing the outer surface and the inner surface of the propulsion unit nozzle.

The invention is particularly, but not exclusively, advantageous for obtaining propulsion unit nozzles that are more efficient in terms of design and manufacturing, especially when the design includes surfaces of double and triple curvatures.

According to a further aspect, the propulsion unit nozzle is a propeller nozzle adapted to be arranged around the propeller of a marine propulsion unit. However, other uses of the nozzle may also be envisaged. In one embodiment, the propulsion unit nozzle may be adapted for use in propulsion unit using a water jet as an alternative to a propeller.

The invention further relates to a propulsion unit for a vessel comprising the above described propulsion unit nozzle and to a method for the manufacture of such propulsion unit nozzle.

These and other aspects of the invention will be apparent from and elucidated with reference to the embodiments described hereinafter.

BRIEF DESCRIPTION OF THE FIGURES

The propulsion unit nozzle according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
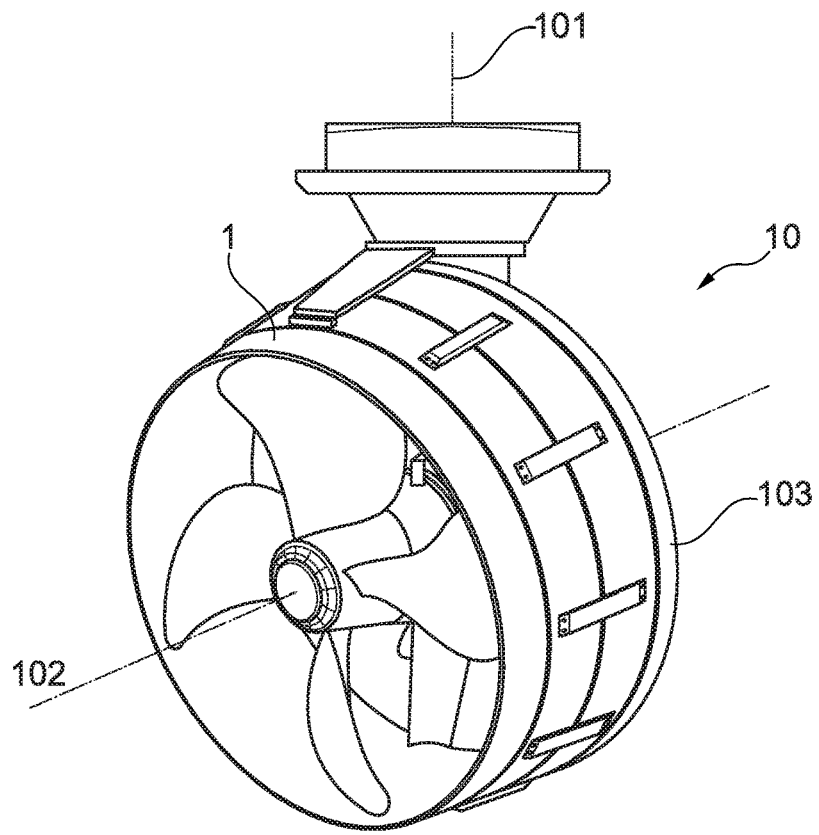
FIG. 1 shows a prior art propulsion unit in the form of an azimuth thruster.

FIG. 1 shows a traditional propulsion unit, in the form of an azimuth thruster. When mounted on a vessel the thruster is rotatable about a mount axis 101 to change a direction in which a propeller thrust is directed. The propeller 103 is rotatable about a propeller axis 102, and around the propeller, a propulsion unit nozzle 1 is provided to improve the hydrodynamic characteristics of the thruster.

As seen the shape of the outer surfaces of the propulsion unit nozzle of FIG. 1 are quite simple and comprised primarily by surfaces of single curvature.

Figure 2:
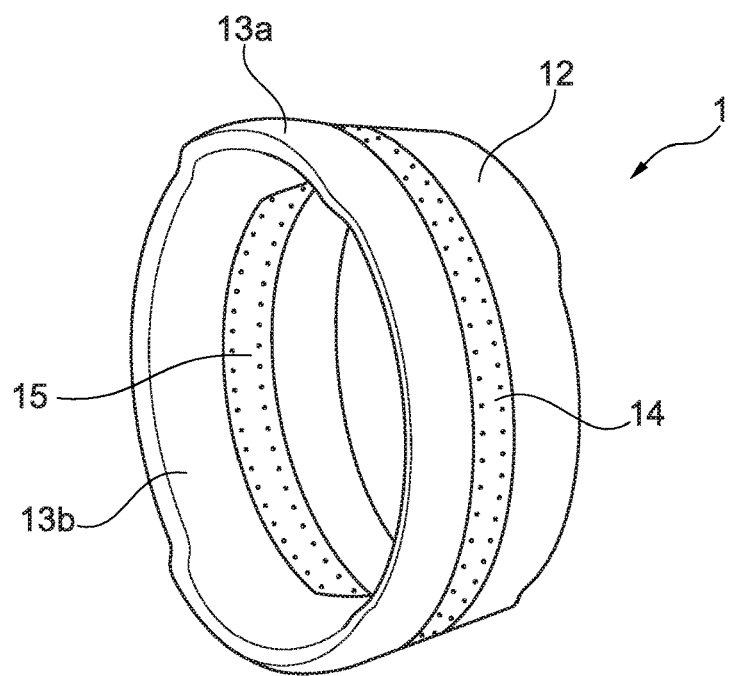
FIG. 2 shows a propulsion unit nozzle according to one embodiment of the invention.
Figure 3:
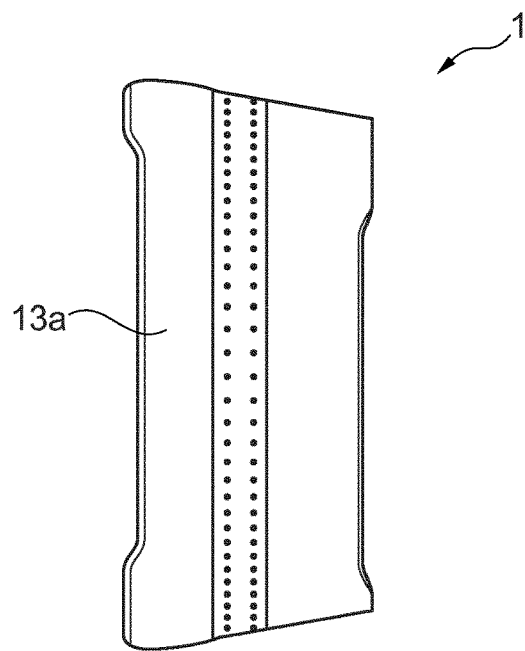
FIG. 3 shows the propulsion unit nozzle of FIG. 1 seen from the side.

FIG. 2 shows a propulsion unit nozzle according to one embodiment of the present invention. In comparison with the nozzle of FIG. 1, this propulsion unit nozzle comprises an exterior outer surface 13a and an exterior inner surface 13b, of a complex design including surfaces of multiple curvatures. The surface geometries of the nozzle also vary along the circumference of the propulsion unit nozzle. In FIG. 3, the same propulsion unit nozzle is viewed from the side, and it is seen that a width of the nozzle may vary along the circumference of the nozzle.

Figure 4:
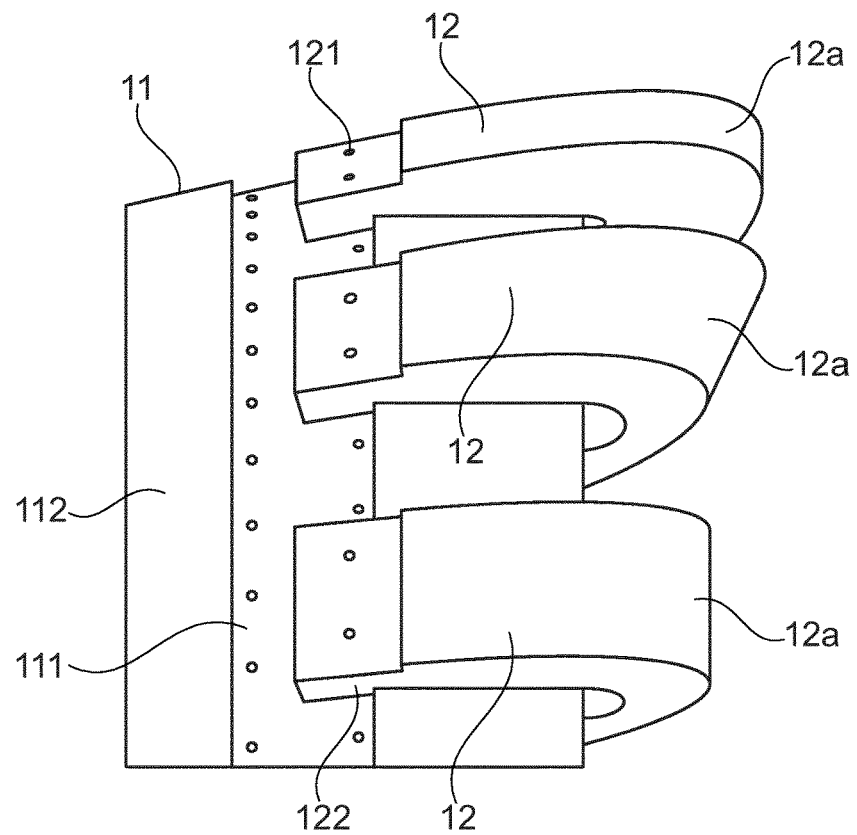
FIG. 4 shows parts of hydrodynamic elements arranged on a load bearing core structure for illustrative purposes.
Figure 5:
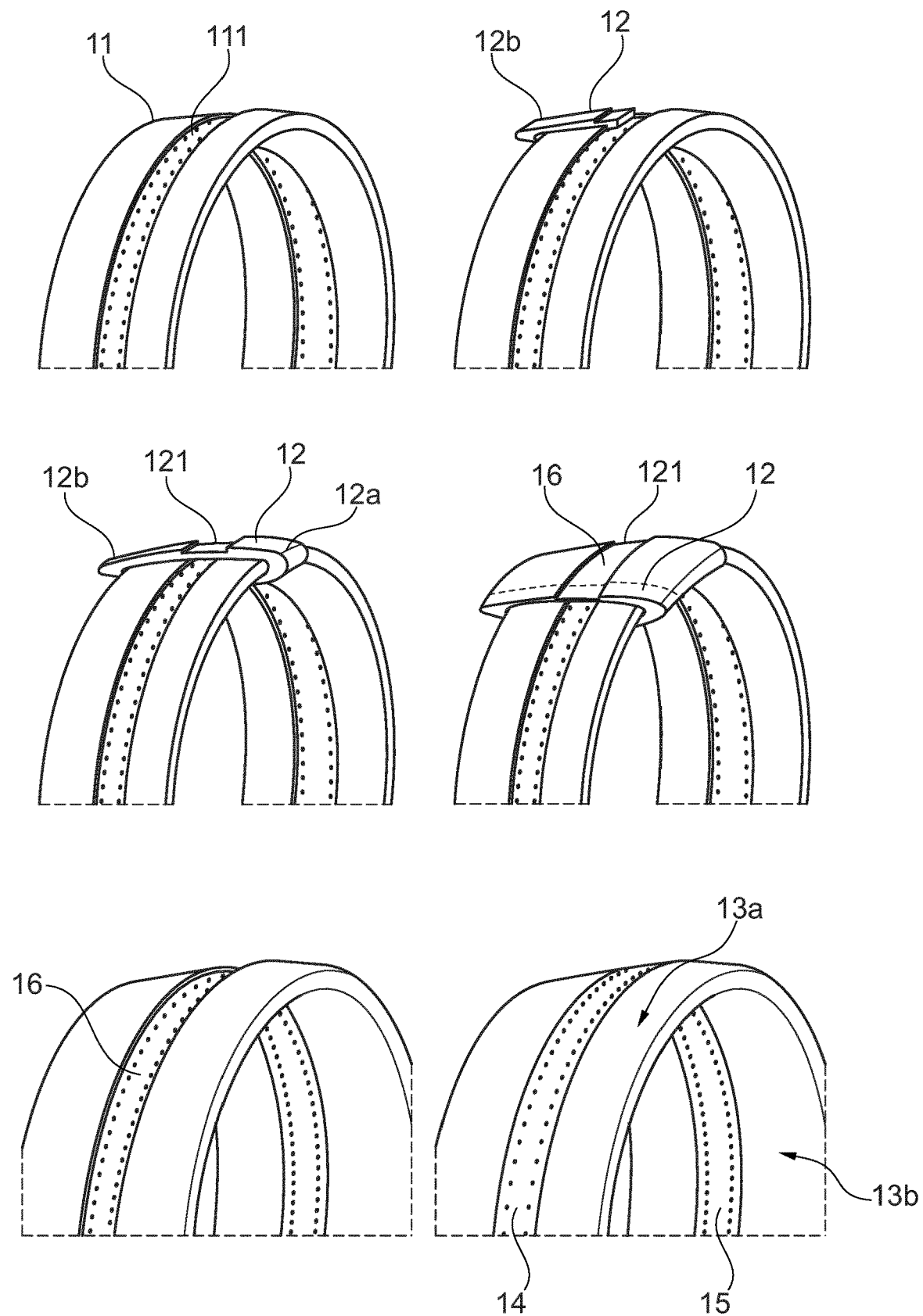
FIG. 5 illustrates how a propulsion unit nozzle may be assembled based on a core structure and a plurality of hydrodynamic elements.

Referring to FIGS. 4 and 5, the construction of a propulsion unit nozzle according to one embodiment of the invention is described in further detail. The propulsion unit nozzle 1 comprises a core structure 11 adapted to extend in the circumference of the propulsion unit nozzle. In the shown embodiment, the core structure is a substantial circular structure, however other shapes may also be envisaged. The core structure 11 is a continuous structure extending in the full extension of the propulsion unit nozzle. However, in other embodiments the core structure may extend in only a part of the extension of the propulsion unit nozzle. The core structure may thus be discontinued along a section of the propulsion unit nozzle, such as in a lower most part wherein structural forces may be less dominant. The core structure may thus be a fully encircling structure or discontinue partial encircling structure.

The core structure is designed to be the primary load-bearing component of the propulsion unit nozzle and ensures structural integrity of the nozzle. Forces experienced by the propulsion unit nozzle are thus primarily obtained by the core structure, whereby other parts of the propulsion unit nozzle may be designed without the same considerations for structural integrity.

On the core structure a plurality of hydrodynamic elements 12 are mountable to enclose the core structure and thereby define the outer surface 13a and the inner surface 13b of the propulsion unit nozzle. By assembling a plurality of hydrodynamic elements, the surfaces of these hydrodynamic elements together constitutes the outer- and the inner surface of the propulsion unit nozzle. When the hydrodynamic elements are mounted on the core structure, the core structure thus extends between the outer surface and the inner surface of the nozzle.

As shown in FIG. 4 the core structure is provided with an indentation 111 in its outer surface extending around the core structure. Each of the hydrodynamic elements 12 comprises a protrusion 122 adapted to engage in a mating relationship with this indentation. Hereby, proper alignment and fixation of the hydrodynamic elements on the core structure is ensured.

Each of the hydrodynamic elements may comprise a leading part 12a and a trailing part 12b adapted to be assembled on the load bearing structure, seen from FIG. 5. The leading and trailing parts thus provide a hydrodynamic element extending along the entire width of the propulsion unit nozzle.

In FIG. 4, only leading parts 12a are shown to be arranged on the core structure. Each of the hydrodynamic elements 12 comprises an exterior indentation 121, which may be provided on either the leading- or trailing part or on both parts. When the hydrodynamic elements are mounted on the core structure, the indentations 121 provide an outer track 16 extending along the periphery of the outer surface of the propulsion unit nozzle. The outer track 16 is adapted to receive an exterior fastening element 14, as shown in the lower right illustration of FIG. 5. The exterior fastening element secures or clamps the hydrodynamic elements to the core structure, and may be a band or the like extending around the nozzle. Further, the exterior fastening element may be secured directly to the core element by fastening elements extending through the hydrodynamic elements. By arranging the fastening element in an indentation, a smooth outer surface is provided and the fastening element is kept in place.

Similar to the exterior indentation described above, the hydrodynamic elements may comprise an interior indentation providing an inner track extending along the periphery of the inner surface of the propulsion unit nozzle. The inner track is adapted for receiving an interior fastening element 15, also shown in the lower right illustration of FIG. 5. The interior fastening element may also be secured directly to the core structure 11 by fastening elements.

As is seen from FIG. 5, the hydrodynamic elements 12 are mounted piece by piece on the core structure 11 to provide the geometry of the outer surfaces of the propulsion unit nozzle. By combining hydrodynamic elements of a varying geometry, the shape of the propulsion unit nozzle may vary along its periphery, as is seen in FIG. 2. A propulsion unit nozzle with such varying profile along its periphery may be advantageous because the water inflow velocity and angle often varies along the circumference of the propulsion unit nozzle. This may be due to other parts of the vessel, such as parts of the hull or a gearbox, arranged in front of the propulsion unit and therefore restricting the flow of water. As the optimal propulsion unit nozzle profile or geometry depends on water inflow velocity and angle it is advantageously to be able to design propulsion unit nozzles with a varying profile. Hereby, varying surface geometries may be obtained by combining a selection of standard components designed to be combined to provide different geometries. A further advantage of using a plurality of hydrodynamic elements mounted on a core structure is that one or more elements may be exchanged or replaced if changes in the nozzle profile is required or an element is defect.

As the core structure is the load bearing structure of the propulsion unit nozzle this should be manufactured from a material of a relatively high strength, such as a metallic material, for example steel or a composite material. As the core structure is of a relatively simple geometry manufacturing processes including forging, welding and milling can be utilized in an effective manner.

The hydrodynamic elements on the other hand, are of a more complex geometry and these may therefore advantageously be made using casting or moulding processes. Alternatively, the hydrodynamic elements may be of a material that can be shaped into complex geometries in an effective manner.

In one embodiment the hydrodynamic elements are of a casted material, such as a casted non-metallic material, for example a composite material or a polymer material. Materials may be a composite comprising glass or carbon fibres or polyurethane or a combination of these. As the core structure ensures the structural integrity of the propulsion unit nozzle, the hydrodynamic elements do not need any substantial load bearing capabilities. This increases design possibilities and ensures that materials that are advantageously in term of manufacturing can be used. A further advantage of using polymer materials, instead of steel, is that the surfaces of the propulsion unit nozzle may be designed with a lower coefficient of friction, thereby improving the flow of water over the surfaces.

Similar to the prior art propulsion unit nozzle shown in FIG. 1, the propulsion unit nozzle according to one embodiment of the present invention may be part of a propulsion unit for a vessel. The propulsion unit nozzle may be mounted on the thruster using traditional struts extending from the nozzle to a central hub part arranged close to the propeller axis 102. Such struts may be secured directly to the core structure 11 or one of the fastening elements 14, 15. However, the propulsion unit nozzle may also be fastened at the outer surface, for example via the outer fastening element.

As mentioned above, the construction of the propulsion unit nozzle, based a plurality of hydrodynamic elements mounted on a core structure, provides several advantages. In regards to manufacturing, the modular design also provides several opportunities.

The various elements constituting the nozzle, i.e. the core structure and the hydrodynamic elements, can be manufactured using standardised production processes and made to stock. In particular, the hydrodynamic elements can be made in a number of variations with varying geometry. Later on in the manufacturing process, the hydrodynamic elements may thus be assembled to provide a specified shaped for the outer- and inner surfaces of the nozzle. The core structure may also be made to stock either by completely finishing the core structure or by making a partly processed core structure, which can be further customized to a finished core structure according to specification.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A propulsion unit nozzle for being arranged around a propeller in a propulsion unit, the propulsion unit nozzle being defined by an outer surface and an inner surface, wherein the propulsion unit nozzle comprises:
   a load bearing core structure extending in a circumference of the propulsion unit nozzle between the outer surface and the inner surface; and
   a plurality of hydrodynamic elements mounted on and enclosing the load bearing core structure thereby providing the outer surface and the inner surface of the propulsion unit nozzle, wherein the plurality of hydrodynamic elements are of a varying geometry, wherein each of the plurality of hydrodynamic elements extends along the entire width of the propulsion unit nozzle, wherein one or more of the plurality of hydrodynamic elements comprises a leading part and a trailing part adapted to be assembled on the load bearing core structure to provide a hydrodynamic element and wherein each of the plurality of hydrodynamic elements comprises an exterior indentation providing an outer track extending along the periphery of the outer surface of the propulsion unit nozzle, the outer track being adapted for receiving an exterior fastening element.

2. The propulsion unit nozzle according to claim 1, wherein the plurality of hydrodynamic elements are made of a casted material.

3. The propulsion unit nozzle according to claim 1, wherein the plurality of hydrodynamic elements are made of a casted non-metallic material.

4. The propulsion unit nozzle according to claim 1, wherein the plurality of hydrodynamic elements are made from a composite material or a polymer material.

5. The propulsion unit nozzle according to claim 4, wherein the load bearing core structure is made of a metallic material.

6. The propulsion unit nozzle according to claim 1, wherein each of the plurality of hydrodynamic elements comprises an interior indentation providing an inner track extending along the periphery of the inner surface of the propulsion unit nozzle, the track being adapted for receiving an interior fastening element.

7. The propulsion unit nozzle according to claim 6, wherein the plurality of hydrodynamic elements are clamped on to the load bearing core structure by means of the exterior fastening element and/or the interior fastening element being fastened to the load bearing structure.

8. A propulsion unit for a vessel comprising the propulsion unit nozzle according to claim 1.

9. A method for the manufacture of the propulsion unit nozzle according to claim 1, comprising the steps of:
   manufacturing the load bearing core structure,
   manufacturing the plurality of hydrodynamic elements, and
   mounting the plurality of hydrodynamic elements on the load bearing core structure to obtain a desired geometry of the inner and outer surfaces of the propulsion unit nozzle.

10. The propulsion unit nozzle according to claim 1, wherein the load bearing core structure is made of a metallic material.

11. The propulsion unit nozzle according to claim 1, wherein each of the plurality of hydrodynamic elements comprises an interior indentation providing an inner track extending along the periphery of the inner surface of the propulsion unit nozzle, the inner track being adapted for receiving an interior fastening element.

12. The propulsion unit nozzle according to claim 1, wherein the load bearing core structure defines a continuous cylindrical load bearing surface encircling at least a part of the circumference of the propulsion unit nozzle and wherein each of the plurality of hydrodynamic elements defines a complementary element surface adapted to abut the continuous load bearing surface when the plurality of hydrodynamic elements are mounted on the load bearing core structure.

13. A propulsion unit nozzle for being arranged around a propeller in a propulsion unit, the propulsion unit nozzle being defined by an outer surface and an inner surface, wherein the propulsion unit nozzle comprises:
   a load bearing core structure extending in a circumference of the propulsion unit nozzle between the outer surface and the inner surface; and
   a plurality of hydrodynamic elements mounted on and enclosing the load bearing core structure thereby providing the outer surface and the inner surface of the propulsion unit nozzle;
   wherein each of the plurality of hydrodynamic elements comprises an exterior indentation providing an outer track extending along the periphery of the outer surface of the propulsion unit nozzle, the outer track being adapted for receiving an exterior fastening element.

14. The propulsion unit nozzle according to claim 13, wherein the plurality of hydrodynamic elements are of a varying geometry.

15. The propulsion unit nozzle according to claim 14, wherein the load bearing core structure has a consistent geometry such that each of the plurality of hydrodynamic elements having the varying geometry can be mounted at any location on the load bearing core structure.

16. The propulsion unit nozzle according to claim 13, wherein each of the plurality of hydrodynamic elements extends along the entire width of the propulsion unit nozzle.

17. The propulsion unit nozzle according to claim 16, wherein one or more of the plurality of hydrodynamic elements comprises a leading part and a trailing part adapted to be assembled on the load bearing core structure.

18. The propulsion unit nozzle according to claim 13, wherein each of the plurality of hydrodynamic elements comprises an interior indentation providing an inner track extending along the periphery of the inner surface of the propulsion unit nozzle, the track being adapted for receiving an interior fastening element.

19. The propulsion unit nozzle according to claim 13, wherein the plurality of hydrodynamic elements are made of a casted non-metallic material and wherein the load bearing core structure is made of a metallic material.

\* \* \* \* \*